United States Patent Office

2,998,418
Patented Aug. 29, 1961

2,998,418
ACID MONOAZO DYESTUFFS
Franz Frisch, Arlesheim, Baselland, Switzerland, assignor to Sandoz Ltd., Basel, Switzerland, a Swiss firm
No Drawing. Filed Aug. 27, 1959, Ser. No. 836,334
Claims priority, application Switzerland Aug. 29, 1958
3 Claims. (Cl. 260—198)

This invention relates to acid monoazo dyestuffs of the general formula

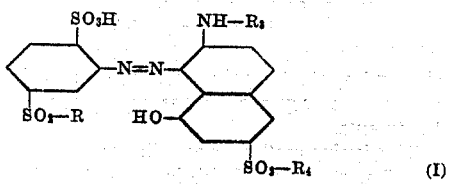

wherein

R stands for an aryl or aryloxy radical which may be substituted with non-water-solubilizing groups, or for an

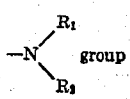

in which $R_1$ is hydrogen or alkyl which may be substituted and $R_2$ is either alkyl, aralkyl, cycloalkyl or aryl which may be substituted, or, together with —N= and —$R_1$, a saturated heterocyclic radical, $R_3$ stands for hydrogen or a phenyl radical containing in ortho position to the —NH— group two low-molecular alkyl radicals and, if desired, further non-water-solubilizing substituents and $R_4$ stands for the hydroxy group, when $R_3$ is a phenyl radical, or, when $R_3$ is hydrogen for an

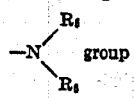

in which $R_5$ is hydrogen or alkyl which may be substituted and $R_6$ is either alkyl, aralkyl, cycloalkyl or aryl which may be substituted or, together with —N= and $R_5$, a saturated heterocyclic radical, with the proviso that R, $R_5$ and $R_6$ are so chosen that when R contains a large number of carbon atoms the total number of carbon atoms in $R_5$ and $R_6$ shall be small, or conversely that when R contains a small number of carbon atoms that total number of carbon atoms in $R_5$ and $R_6$ shall be large.

The process for the production of the new acid monoazo dyestuffs consists in coupling 1 mole of the diazo compound of an amine of the general formula

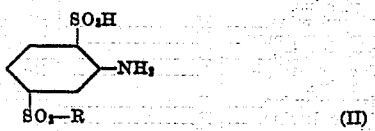

wherein R possesses one of the aforecited meanings, with 1 mole of a coupling component of the general formula

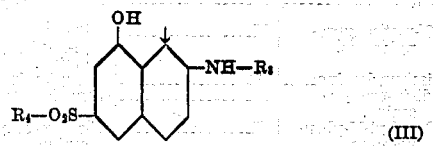

wherein $R_3$ and $R_4$ each possess one of the aforecited meanings, in a strongly to weakly acid medium at temperatures between 5° and 30° C.

Most of the new acid monoazo dyestuffs are obtained as red powders. They serve to dye and to print wool, silk, leather and synthetic polyamide fibers and draw on these fibers from neutral to weakly acid baths in red to bordeaux shades which possess very good fastness to light and wet treatments (washing, water, sea water, perspiration, acid and alkaline milling). The dyeings also show good to very good fastness to acids, alkali, chlorine, peroxide bleaching, pressing crocking and dry cleaning and are well dischargeable. The dyestuffs also reserve well cotton, viscose filament yarn viscose staple fiber, cellulose-2½- and -triacetate and polyester fibers. The wet fastness properties are especially good when the molecular weight of the dyestuff used is higher than 600. To obtain dyestuffs having good wet fastness properties 2-amino-8-hydroxynaphthalene-6-sulfonic acid methyl-amide for example, must be coupled with the diazo compound of a diazo component of Formula II containing a high molecular radical R, while the higher molecular coupling components of Formula III, in which e.g. $R_3$ represents (2'.6'-dimethyl)-phenyl and $R_4$ hydroxyl or $R_3$ denotes hydrogen and $R_4$ phenylamino in accordance with the above description, already in combination with the diazo compounds of diazo components of Formula II, in which R represents an unsubstituted phenyl of phenoxy radical or a low molecular mono- or dialkyl amide radical, yield monoazo dyestuffs which have good to very good wet fastness properties.

Suitable coupling components of Formula III are the derivatives of 2-amino-8-hydroxynaphthalene-6-sulfonic acid in which the sulfonic acid group is closed by a substituted amide radical. The latter are obtained by the known methods from 2-acetylamino-8-hydroxynaphthalene-6-sulfonic acid chloride by reaction with primary or secondary amines and subsequent splitting-off of the acetyl group; examples are methylamide, dimethylamide, β-methoxyethyl amide, di-(β-hydroxyethyl)-amide, morpholide, and the phenylamide, N-methyl-N-phenylamide, N-ethyl-N-phenylamide or N-β-hydroxyethyl-N-phenylamide of 2-amino-8-hydroxynaphthalene-6-sulfonic acid. Other suitable azo compounds are 2-phenylamino-8-hydroxynaphthalene-6-sulfonic acids with a phenyl radical substituted in the 2'.6' positions, preferably 2-(2'.6'-dimethyl)-phenylamino-, 2-(2'.4'.6'-trimethyl)-phenylamino- and 2-(2'.4'.5'.6'-tetramethyl)-phenylamino-8-hydroxynaphthalene-6-sulfonic acid.

In the following examples the parts and percentages are by weight and the temperatures in degrees centigrade.

EXAMPLE 1

41.1 parts of 3-amino-4-sulfobenzene-1-sulfonic acid-(4'-cyclohexyl)-phenyl ester are dissolved in 1000 parts of water with the aid of sodium hydroxide. A solution of 8 parts of sodium nitrite in 20 parts of water is added with stirring, and the resulting solution is stirred into a mixture of 200 parts of ice, 200 parts of water and 35 parts of concentrated hydrochloric acid. After stirring for 3 hours at 0–10°, the precipitated diazo compound is filtered off and washed with dilute hydrochloric acid.

The diazo compound is homogeneously suspended in 1000 parts of water at 0–5°. A solution of 36 parts of 2-(2'.4'.6'-trimethyl)-phenylamino-8-hydroxynaphthalene-6-sulfonic acid in 200 parts of water is added at 60–70° in a fine jet. The mass is stirred at 25–30° until coupling is completed, then the dyestuff is precipitated with crystallized sodium acetate, filtered off and dried. It is a dark red powder which dissolves in hot water with a bright bordeaux-red coloration and dyes wool, silk and synthetic polyamide fibers from a neutral to weakly acid bath is in bright bordeaux shades of very good fastness to light and wet treatments.

EXAMPLE 2

36.4 parts of 3-amino-4-sulfobenzene-1-sulfonic acid-di-(n-butyl)-amide are diazotized as described in Example 1. The diazo compound is filtered off, suspended in 800 parts of cold water and mixed with a solution at 60–70° of 37 parts of 2-(2'.6'-diethyl)-phenyl-amino-8-hydroxy-naphthalene-6-sulfonic acid in 200 parts of water, added in a fine jet. The mass is mixed at 25–30° until coupling is completed and 30 parts of sodium acetate are added to precipitate the dyestuff. It is filtered, purified if necessary by re-dissolving and reprecipitation and dried. It is a dark red powder which gives blue-red solutions in hot water and dyes wool, silk and synthetic polyamide fibers from neutral to weakly acid baths in bright blue-red shades with very good fastness properties to light and wet treatments.

EXAMPLE 3

37.8 parts of 3-amino-4-sulfobenzene-1-sulfonic acid-n-nonylamide are diazotized as described in Example 1 and the filtered diazo compound is suspended in 500 parts of water at 0–5°. A warm solution of 25.2 parts of 2-amino-8-hydroxynaphthalene-6-sulfonic acid methylamide in 500 parts of water and 15 parts of concentrated hydrochloric acid is added dropwise. After stirring for 2 hours at 10–20° a solution of 40 parts of crystallized sodium acetate in 200 parts of water is dropped in slowly. When the diazo compound has disappeared, the dyestuff is filtered off, re-dissolved in dilute sodium carbonate solution and reprecipitated, if necessary, and dried.

It is a red powder which dissolves in hot water with a red coloration and dyes wool, silk and synthetic polyamide fibers in bright red shades having good to very good fastness properties to light and wet treatments.

EXAMPLE 4

28 parts of 3-amino-4-sulfobenzene-1-sulfonic acid dimethylamide are dissolved in 500 parts of water by means of sodium hydroxide. After the addition of a solution of 8 parts of sodium nitrite in 30 parts of water, 35 parts of concentrated hydrochloric acid are added at 0–5°. After stirring for 3 hours at 5–10°, the excess nitrous acid is destroyed with amidosulfonic acid and a solution of 32.8 parts of 2-amino-8-hydroxynaphthalene-6-sulfonic acid-N-methyl-N-phenylamide in 100 parts of acetone is added dropwise. After a further 3 hours' stirring, a solution of 30 parts of crystallized sodium acetate in 100 parts of water is dropped in. Stirring is continued for 6 hours, after which the acetone is evaporated and the dyestuff precipitated and dried. It is a red powder which gives red solution in hot water and dyes wool, silk and synthetic polyamide fibers in bright red shades which have very good fastness properties to light and wet treatments.

The dyeing method is as follows:

100 parts of wool fabric are entered in a dyebath at 40° composed of 5000 parts of water, 10 parts of anhydrous sodium sulfate and 1 part of dyestuff. The bath is heated to 100° in 15 minutes and maintained at this temperature for 30 minutes. 20 parts of a 10% aqueous acetic acid solution are added and the dyeing process is completed in a further 30 minutes' heating at 100°. During the dyeing process the water lost by evaporation is constantly replaced. The dyed fabric is subsequently rinsed with water and dried.

Further acid monoazo dyestuffs which are obtainable by procedures the same or similar to those of Examples 1 to 4 are set out in the following table. They correspond to the General Formula I and are characterized by the symbols R, $R_3$, $R_4$ and the shades of their dyeings on wool.

Table

| Example No. | R | $R_3$ | $R_4$ | Shade of the Wool Dyeing |
|---|---|---|---|---|
| 5 | 4'-iso-octylphenoxy. | H | methylamino | red. |
| 6 | 4'-tert.amylphenoxy. | 2.6-dimethyl-phenyl. | —OH | blue-red. |
| 7 | dicyclohexylamino. | H | 2'-hydroxy-ethyl-amino. | red. |
| 8 | n-butylamino | H | n-hexylamino | Do. |
| 9 | (4'-methoxy)-butylamino. | H | dicyclo-hexyl-amino. | Do. |
| 10 | 4'-tert.butylphenoxy. | H | ethylamino | Do. |
| 11 | diethylamino | H | di-(n-butyl)-amino. | Do. |
| 12 | n-amylamino | 2.4.6-trimethyl-phenyl. | —OH | blue-red. |
| 13 | hexylamino | 2.4.5.6-tetramethylphenyl. | —OH | Do. |
| 14 | heptylamino | H | diethylamino | red. |
| 15 | n-octylamino | H | di-(2'-hydroxyethyl)amino. | Do. |
| 16 | N-methyl-N-phenylamino. | H | morpholino | Do. |
| 17 | N-2'-hydroxy-ethyl-N-phenylamino. | H | 3'-methoxypropylamino. | Do. |
| 18 | phenylamino | H | ethylamino | Do. |
| 19 | cyclohexylamino | H | methylamino | Do. |
| 20 | benzylamino | H | do | Do. |
| 21 | 2'-ethoxy-ethylamino. | H | N-ethyl-N-phenylamino. | Do. |
| 22 | isoamylamino | H | phenylamino | Do. |
| 23 | isoamylamino | H | cyclohexylamino | Do. |
| 24 | diethylamino | H | heptylamino | Do. |
| 25 | di-(2'hydroxyethyl-)amino. | H | n-octylamino | Do. |
| 26 | morpholino | H | N-methyl-N-phenylamino. | Do. |
| 27 | 3'-methoxypropylamino. | H | N-2'-hydroxyethyl-N-phenyl-amino. | Do. |
| 28 | isobutylamino | H | phenylamino | Do. |
| 29 | di-(n-propyl)-amino. | H | benzylamino | Do. |
| 30 | N-ethyl-N-phenylamino. | H | 2'-ethoxyethyl-amino. | Do. |
| 31 | phenylamino | H | methylamino | Do. |
| 32 | di-(3'-hydroxy-propyl)-amino. | H | piperidino | Do. |

Table—Continued

| Example No. | R | R₃ | R₄ | Shade of the Wool Dyeing |
|---|---|---|---|---|
| 33 | 3'-methoxy-propylamino. | H | benzylamino | Red. |
| 34 | 3'-methylphenylamino. | H | 4'-methoxybutylamino. | Do. |
| 35 | 2'-methyl-phenoxy. | H | methylamino | Do. |
| 36 | 2'.4'-dimethylphenoxy. | H | ----do---- | Do. |
| 37 | 2'-methoxyphenylamino. | H | isoamylamino | Do. |
| 38 | di-(3'-hydroxypropylamino). | H | n-butylamino | Do. |
| 9 | 4'-chlorophenylamino. | H | methylamino | Do. |
| 40 | 2'.5'-dichlorophenylamino. | H | ----do---- | Do. |
| 41 | 4'-chlorophenoxy | H | ----do---- | Do. |
| 42 | 2'.4'-dichlorophenoxy. | H | ----do---- | Do. |
| 43 | piperidino | H | 3'-hydroxypropylamino. | Do. |
| 44 | benzylamino | H | 3'-methoxy-propylamino. | Do. |
| 45 | 3'-methoxybutylamino. | H | 2'-methylphenylamino. | Do. |
| 46 | diethylamino | H | 4'-methylphenylamino. | Do. |
| 47 | ----do---- | H | 2'.4'-dimethylphenylamino. | Do. |
| 48 | ----do---- | H | 4'-methoxyphenylamino. | Do. |
| 49 | cyclohexylamino | H | di-(3'-hydroxypropyl)-amino. | Do. |
| 50 | n-butylamino | H | 4'-chlorophenylamino. | Do. |
| 51 | ----do---- | H | 3'.4'-dichlorophenylamino. | Do. |
| 52 | ----do---- | H | 2'-chlorophenylamino. | Do. |
| 53 | ----do---- | H | 2'.4'-dichlorophenylamino. | Do. |
| 54 | phenylamino | H | n-propylamino | Do. |
| 55 | ----do---- | H | isopropylamino | Do. |
| 56 | ----do---- | H | isobutylamino | Do. |
| 57 | phenyl | H | methylamino | Do. |
| 58 | 4'-methylphenyl | H | ethylamino | Do. |
| 59 | 4'-chlorophenyl | H | 2'-ethoxyethylamino. | Do. |
| 60 | ----do---- | H | methylamino | Do. |
| 61 | phenyl | H | phenylamino | Do. |
| 62 | ----do---- | 2.6-dimethylphenyl. | —OH | blue-red. |
| 63 | ----do---- | 2.4.6-trimethylphenyl. | —OH | Do. |
| 64 | phenyl | 2.4.5.6-tetramethylphenyl. | —OH | Do. |
| 65 | 2'-methylphenyl | 2.4.6-trimethylphenyl. | —OH | Do. |
| 66 | n-octylamino | ----do---- | —OH | Do. |
| 67 | ethylamino | H | phenylamino | red. |
| 68 | 2'-hydroxyethylamino. | H | 4'-chlorophenylamino. | Do. |
| 69 | methylamino | H | 2'.5'-dichlorophenylamino. | Do. |
| 70 | n-propylamino | H | 2'-ethylhexylamino. | Do. |
| 71 | isopropylamino | H | n-nonylamino | Do. |
| 72 | 4'-methylphenylamino. | 2.6-dimethylphenyl. | —OH | blue-red. |
| 73 | 2'-ethylhexylamino. | ----do---- | —OH | Do. |
| 74 | 4'-ethylphenoxy | 2.4.6-triethylphenyl. | —OH | Do. |
| 75 | 4'-isopropylphenoxy. | H | di-(3'-methoxypropyl)-amino. | red. |

Formulae of representative dyestuffs of the foregoing examples are as follows:

EXAMPLE 1

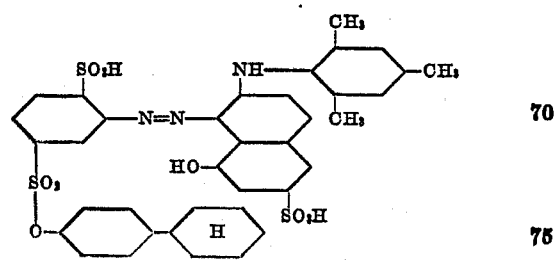

EXAMPLE 2

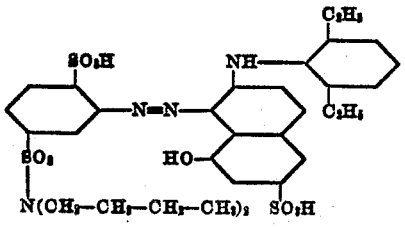

EXAMPLE 3
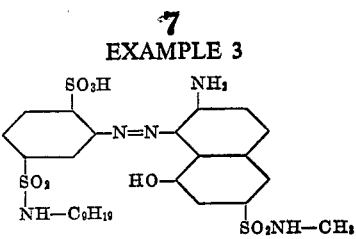

EXAMPLE 4
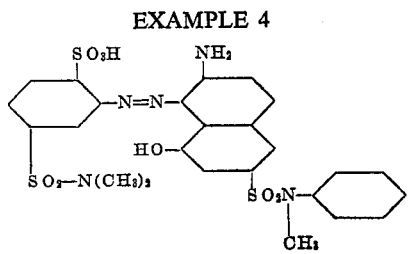

EXAMPLE 5
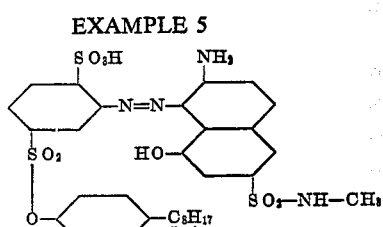

EXAMPLE 6
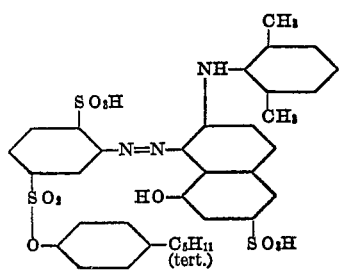

EXAMPLE 7
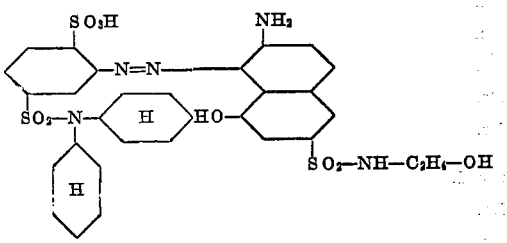

Having thus disclosed the invention what I claim is:

1. An acid monoazo dyestuff of the general formula

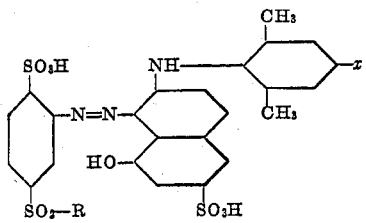

wherein R represents a member selected from the group consisting of phenoxy, alkylphenoxy with 1 to 8 carbon atoms in the alkyl group and cyclohexylphenoxy, x represents a member selected from the group consisting of hydrogen and methyl.

2. The monoazo dyestuff of the formula

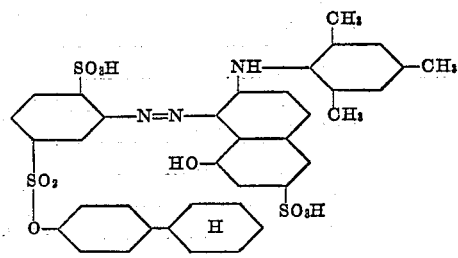

3. The monoazo dyestuff of the formula

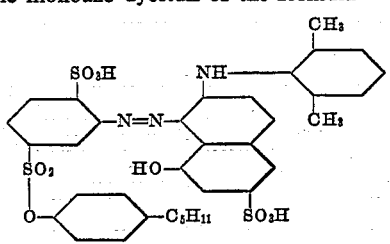

References Cited in the file of this patent
UNITED STATES PATENTS

| | | |
|---|---|---|
| 1,903,599 | Schweitzer | Apr. 11, 1933 |
| 2,205,849 | Fischer et al. | June 25, 1940 |
| 2,638,403 | Stead et al. | May 12, 1953 |
| 2,750,377 | Hindermann et al. | June 12, 1956 |
| 2,776,962 | Frisch | Jan. 8, 1957 |
| 2,892,671 | Alsberg et al. | June 30, 1959 |

OTHER REFERENCES

Colour Index, 2nd Ed. 1956, Society of Dyers and Colourists, vol. 1, page 1001, under "The Non-Textile Usage"; POSL.